United States Patent [19]

Araseki et al.

[11] 4,167,653
[45] Sep. 11, 1979

[54] ADAPTIVE SPEECH SIGNAL DETECTOR

[75] Inventors: Takashi Araseki; Kazuo Ochiai, both of Tokyo, Japan

[73] Assignee: Nippon Electric Company, Ltd., Tokyo, Japan

[21] Appl. No.: 895,561

[22] Filed: Apr. 12, 1978

[30] Foreign Application Priority Data

Apr. 15, 1977 [JP] Japan ................................. 52-43841
May 12, 1977 [JP] Japan ................................. 52-55068

[51] Int. Cl.$^2$ ............................................. H04J 6/00
[52] U.S. Cl. .............................. 179/1 SC; 179/1 VC; 179/1 HF
[58] Field of Search ............... 179/1 SC, 1 VC, 1 HF, 179/170.2, 15 AS

[56] References Cited

U.S. PATENT DOCUMENTS 3,970,786  7/1976  Randmere ........................ 179/1 HF
4,028,496  6/1977  La Marche et al. ............ 179/15 AS Primary Examiner—Kathleen H. Claffy
Assistant Examiner—E. S. Kemeny
Attorney, Agent, or Firm—Sughrue, Rothwell, Mion, Zinn and Macpeak

[57] ABSTRACT

An adaptive speech signal detector for use in a 4-wire telephone channel performs an adaptive threshold value setting operation depending on the channel noise level on a transmitter-side channel to detect a speech signal present at the transmitter. The adaptive operation of the speed signal detector is inhibited, however, if the signal level at the related receiver-side channel becomes higher than a preset value. This permits the use of the adaptive speech signal detector with DSI (digital speech interpolation) systems without malfunction due to the operation of an echo suppressor.

2 Claims, 6 Drawing Figures

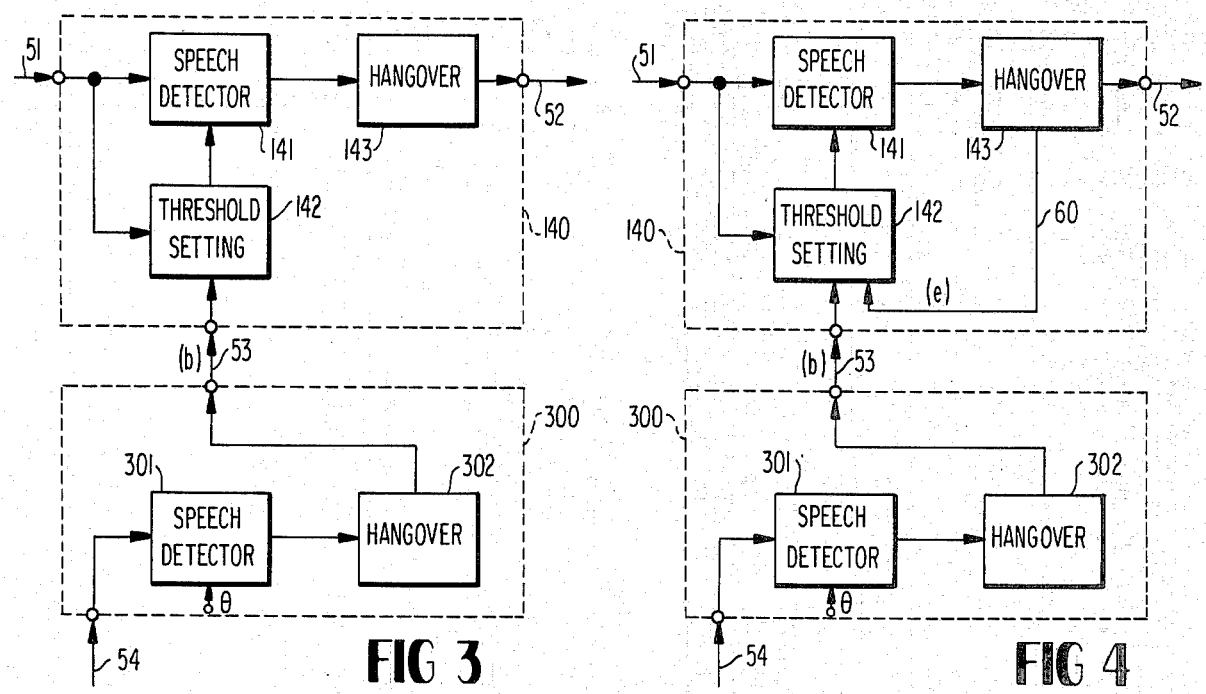
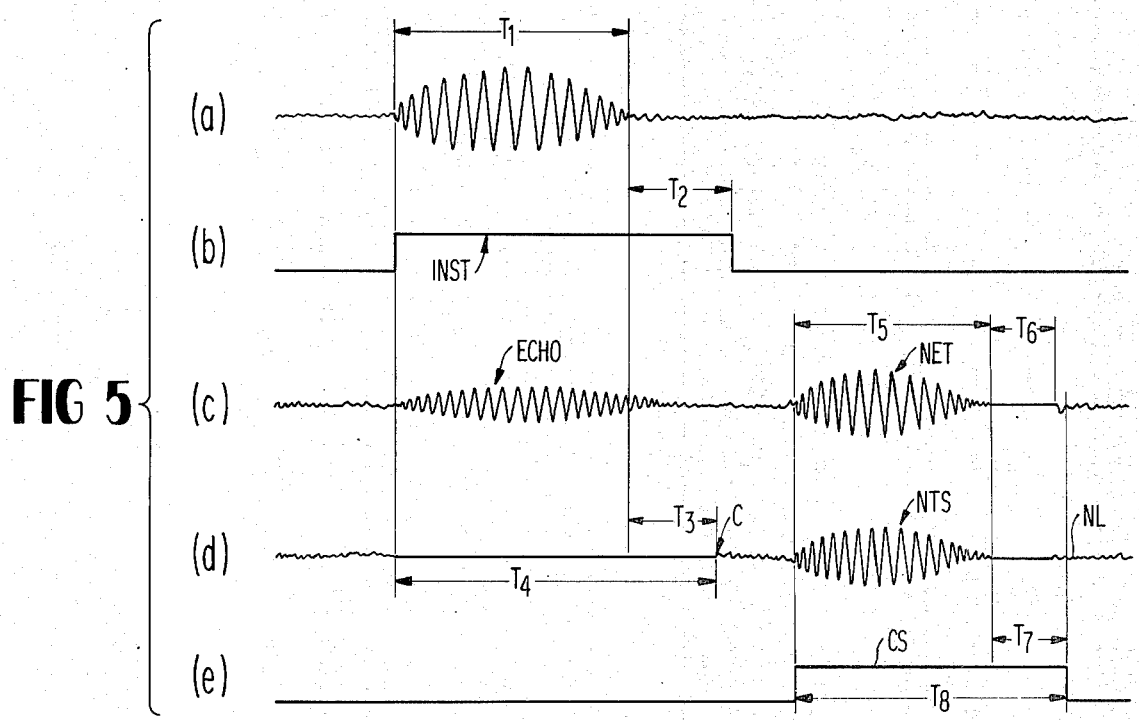
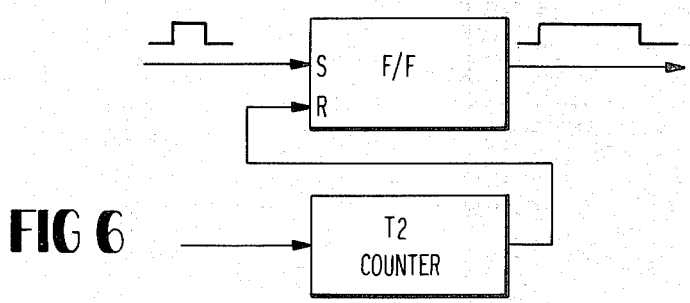

ADAPTIVE SPEECH SIGNAL DETECTOR

BACKGROUND OF THE INVENTION

The present invention relates to an adaptive speech signal detector capable of adaptively setting a threshold value for use in a 4-wire telephone channel.

To increase the efficiency of the transmission of a speech signal over a telephone channel, the realization of a speech signal detector with the excellent detection capability is often desired. For instance, a DSI (digital speech interpolation) system to improve the channel utilization efficiency is a system based on the fact that the speech activity, i.e., the average length of time occupied by the speech of a subscriber on the phone is less than 50 percent of the total length. More particularly, in a given terminal station, the states of the respective channels connected to a large number of subscribers (hereinafter called subscriber channels) are supervised to select out of subscriber channels only those subscriber channels on which speech signals are present, and the transmission is carried out for another terminal station. Since the speech activity of an average subscriber is generally 30-40%, the number of the channels for the transmission between these terminal stations (DSI channels) can be made about one-half in number of the subscriber channels.

In such DSI system, channel interruption frequently occurs during the conversation, and so, the detection capability of a speech detector is one of principal factors to determine the characteristics of the DSI system. For this reason, if the speech detection takes too much time, the time required for performing the speech detection for a subscriber channel on which a speech signal begins to appear and for connecting the subscriber channel to a DSI channel, is increased. Accordingly, the speech on the subscriber channel before it is connected to the DSI channel is not transmitted to a party subscriber with the result that speech-front mutilation occurs frequently. On the other hand, when the speech detection rate is increased to reduce the mutilation, the speech signal detector increasingly malfunctions due to noise, the speech activity is increased, causing a concern that the probability of the saturation of the DSI channels is enlarged to cause the speech interruption.

To solve such problems in the DSI system, the use of an adaptive speech detector in which the threshold value for the speech detection is adaptively varied depending on the noise level on a channel, or a speech detector in which in addition to amplitude information of a speech signal, the zero-crossing information of the speech signal is used, has been proposed. Such a speech signal detector having the threshold value adaptively set depending on the channel noise level is proposed in FIG. 1 of the U.S. Pat. No. 4,028,496 or in FIG. 2 of the U.S. Pat. No. 4,052,568. Furthermore, the speech detector using the zero-crossing information is disclosed in the U.S. Pat. No. 4,001,505.

In such an adaptive speech signal detector, the threshold value is set at a value as small as possible within the range where noise present on a channel is not erroneously detected, and if the magnitude of the noise signal level is gradually varied, the threshold value is also varied following the variation of the noise signal level. As a result, in case where the noise amplitude is small, the threshold value takes a small value so that even low-level speech can be easily detected and the speech mutilation can be reduced. Whereas in the case of the large noise amplitude, the threshold value is increased, and as a result, the detector does not malfunction due to noise of the large amplitude. Although the speech signal detection is delayed due to the increase of the threshold value, the degree of the degradation in quality of speech signals caused by the increase of the speech mutilation is small, if the noise amplitude is large, because the quality of the original speech signals is already degraded. In view of these facts, the adaptive speech signal detector would appear to be a detector suitable for the DSI. However, since the application of DSI system to channels on which echo signals are present, is accompanied with the enhancement of the virtual speech activity due to the echo signals, the DSI efficiency (the degree of the reduction in number of channels by employing the DSI system) is remarkably lowered. The conventional telephone channel composed of a 2-wire channel and a 4-wire channel can not avoid such an echo signal. Accordingly, an echo suppressor is normally interposed between the DSI system and subscribers.

For details of such an echo suppressor, reference is made to an article by P. T. Brady and G. K. Helder entitled "Echo Suppressor Design in Telephone Communications" published in *The Bell System Technical Journal*, Vol. 42, No. 6, pp. 2893–2917, November issue, 1963. The operation of the echo suppressor will be briefly described hereunder.

An echo suppressor performs switching operations for suppressing an echo signal in such a manner that a large loss is provided or the interruption is made at a transmitter when a received signal is larger than a certain fixed value and is also larger than a transmission signal. For this reason, as soon as a speech signal is given to a receiver, the echo suppressing switch is actuated to prevent the echo signal from being outputted and at the same time, the noise level at the output terminal of the echo suppressor changes momentarily. If the echo suppressor is interposed between subscribers and the DSI system, then in response to the operation of the echo suppressing switch, the noise level on the channel inputted to the transmitter of the DSI system similarly changes immediately. Consequently, the adaptive speech detector used in the DSI system malfunctions at the time point when the noise level has changed abruptly from a small amplitude to the normal one.

Furthermore, in an echo suppressor, when a speech signal of a near end subscriber which is deemed not to be an echo signal is detected at a transmitter, the attenuation of 5 to 6 dB (decibels) is inserted into a receiver in order to relatively intensify (in order to put a preference on) the speech signal of this subscriber against a speech signal of a remote end subscriber. In this case also, there is not only the possibility of the noise level change on the transmitter-side subscriber channel but also the possibility of the malfunction of the adaptive speech signal detector.

Thus, the adaptive speech signal detector cannot be directly used in the DSI system. On the other hand, though the above-mentioned detection system employing the zero-crossing information improves the detection capability for periodic speech signals or signals having a number of high frequency components, there still remains the problem that the detection for signals of a small amplitude and of many low frequency components are difficult.

The conventional adaptive speech signal detector, therefore, has a disadvantage in that its interposition in 4-wire channels between the DSI system and subscribers does not permit the achievement of the expected performance.

SUMMARY OF THE INVENTION

It is one object of the present invention to provide an adaptive speech signal detector for use in a 4-wire telephone channel in which if the channel noise is at a low level, a speech signal can be detected in a very short period of time, while if the noise is at a high level, the speech can be detected with a small malfunction rate caused by noise and the detecting operation can be achieved adaptively so that the malfunction due to an echo suppressor may not arise.

The present adaptive speech signal detector interposed in a 4-wire telephone channel for performing an adaptive threshold value setting operation depending on the channel noise level on a transmitter-side channel to detect a speech signal present at the transmitter, comprises first speech signal detector means having a transmission signal inputted thereto, threshold value setting means for setting a threshold value for the speech signal detection and giving the set value to said first speech signal detector means, a first hangover circuit for extending the output signal of said first speech signal detector means by a first predetermined period of time, second speech signal detector means having a reception signal inputted thereto, and a second hangover circuit for prolonging the output signal of said second speech signal detector means by a second predetermined period of time to control said threshold value setting means.

Also, the present adaptive speech signal detector to be interposed in a 4-wire telephone channel for performing an adaptive threshold value setting operation in accordance with the channel noise level, comprises first speech signal detector means having a transmission signal inputted thereto, threshold value setting means for setting a threshold value for speech signal detection and giving the set value to said first speech signal detector means, a first hangover circuit for extending the output signal of said first speech signal detector means by a first predetermined period of time to control said threshold value setting means, second speech signal detector means having a reception signal inputted thereto, and a second hangover circuit for extending the output signal of said second speech signal detector means by a second predetermined period of time to control said threshold value setting means.

BRIEF DESCRIPTION OF THE DRAWINGS

Now, the present invention will be described in greater detail in conjunction with the accompanying drawings, in which:

FIG. 3 shows one embodiment of the present invention;

FIG. 4 shows a second embodiment of the present invention;

FIG. 5 is a waveform diagram for explanation of the present invention; and

FIG. 6 is a block diagram showing one example of a hangover circuit 302 used in the present speech detector.

DETAILED DESCRIPTION OF THE INVENTION

In the following description, it should be noted that unless any reference is specifically given to a party station, the description is made in connection with the structure (in the local station) shown in FIGS. 1 and 2.

Figure 1:
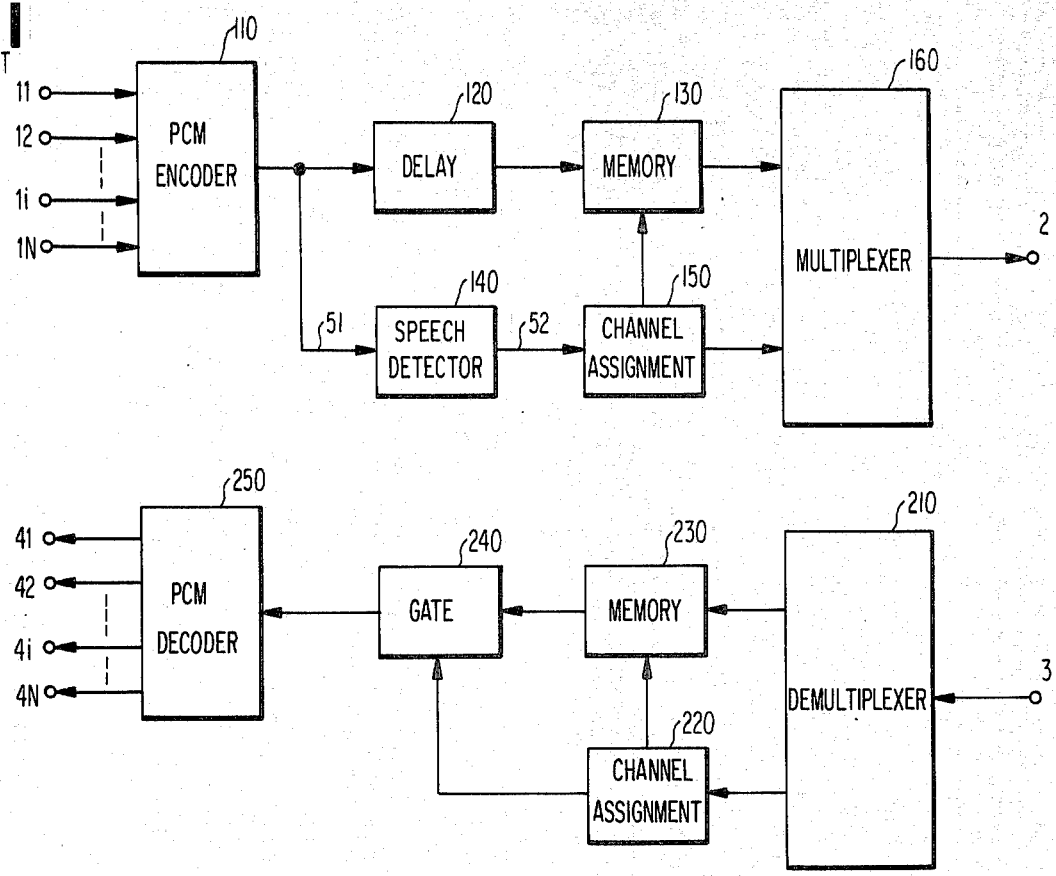
FIG. 1 is a block diagram showing a conventional DSI system.

In a conventional DSI system illustrated in FIG. 1, only one terminal station (a local station) is shown. In this DSI system, transmitter-side subscriber channels and receiver-side subscriber channels connected to a large number of subscribers are respectively connected to input terminals 11, 12, ..., li, ..., 1 N and input terminals 41, 42, ... 4i, ..., 4 N. A PCM encoder 110 converts the signals from the respective subscribers into a time-division multiplexed digital signal. The output of the PCM encoder 110 is fed to a transmitter-side speech signal detector 140 and a delay circuit 120. The speech signal detector 140 supervises the presence of speech signals on the respective subscriber channels through a signal line 51, and gives the supervised result to a channel assignment circuit 150 through a signal line 52. The channel assignment circuit 150 writes in a memory 130 only assigned signals among the respective subscriber channel signals delayed through the delay circuit 120. Although the delay circuit 120 has been conventionally used to compensate for the delay in speech detection as well as the delay in calculation relating to the assignment determination in the channel assignment circuit 150, the degradation in quality is little even without the delay circuit 120 if the speech detection capability is high and consequently, the detection time is short as is the case with the illustrated example in the prior art. An assignment signal delivered from the channel assignment circuit 150 and the output of the memory 130 are mixed by a multiplexer 160 and outputted from a transmission output terminal 2. The DSI system on the party side also has the same structure as that shown in FIG. 1. A signal received from the party station is given through a reception terminal 3, and the channel assignment signal is selected out of the received signals by a demultiplexer 210 and is fed to a receiver-side channel assignment circuit 220. The receiver-side channel assignment circuit 220 writes the received signal at a position in a memory 230 corresponding to a predetermined channel, and also controls a gate circuit 240 so that at a predetermined time a signal on a corresponding subscriber channel may be produced. The reproduced time-division multiplex signal is sent to a PCM decoder 250 so that at the output terminals 41, 42, ... 4i, ... 4 N connected to the respective subscribers, speech signals are decoded and outputted.

For details of the method for realizing the DSI system, reference is made to the U.S. Pat. No. 3,644,680 (especially FIG. 4) and to Japanese Patent Application Disclosure No. 114011/1976 (corresponding to the U.S. patent application Ser. No. 560,423), and therefore, the following description will be made only with respect to the parts of the DSI system directly related to the present invention.

Figure 2:
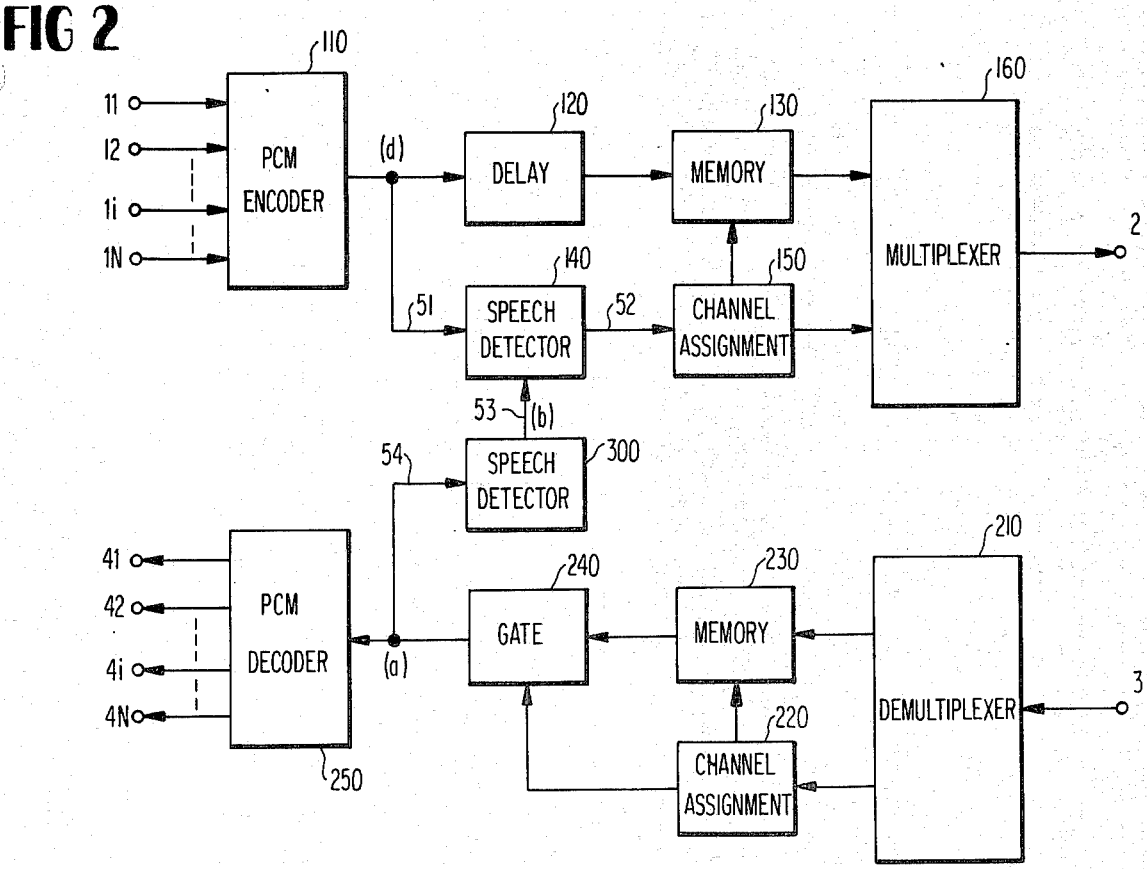
FIG. 2 is a block diagram of the DSI system using an adaptive speech signal detector of the present invention.

In FIG. 2 which shows a first embodiment of the present invention, the present detector is composed of a transmitter-side speech signal detector 140 and a receiver-side speech signal detector 300.

Since the DSI system does not operate efficiently in a channel on which an echo signal is present as described above, an echo suppressor is needed for the use of the DSI system. In case that the echo suppressor is interposed between subscribers and the DSI system, the noise level on a subscriber channel given to a transmitter-side of the DSI system is varied by switching operations in the echo suppressor. Therefore, the adaptive speech signal detector in the DSI system operates erroneously. More particularly, if an input signal appears at the receiver as shown in FIG. 5(a), at the transmitter appears an echo signal (ECHO) of the received signal as well as a speech signal (NET) of a near end subscriber as shown in FIG. 5(c). At this time point, the echo suppressor interrupts the channel during the time period (T1 in FIG. 5(a)) when the received signal is present plus a predetermined period of its extension (T3) for the purpose of suppressing the echo signal. Accordingly, at the output of the echo suppressor there results a soundless state in which even noise is not present during the period of the channel interruption (T4) as shown in FIG. 5(d), and this output is given to the DSI system. The transmitter-side speech signal detector 140 in the DSI system tends to erroneously acknowledge noise as a speech signal at the time point C shown in the middle of FIG. 5(d) when the signal changes from the soundless state to a state where noise is present. As a result, during that period the adapting operation of the speech signal detector must be stopped.

As shown in FIG. 3, the speech signal detector 140 is composed of a threshold value setting section 142 for successively measuring the noise signal level to determine a threshold value, a speech signal detector section 141 for detecting a speech by making use of the threshold value determined by the section 142, and a hangover circuit 143 for holding a detection signal from the section 141 for a predetermined period of time after the detection signal has disappeared. The section 142 is constructed, for instance, in such a manner that if an input signal is larger than the threshold value appropriately set, an integrator contained therein (not shown) is increased by one, whereas if it is smaller, the integrator is reduced by one, and as the above operations are done repeatedly, if the threshold value is set at a value smaller than the input signal, the integrator continues to increase until it reaches a predetermined value when the threshold value is raised, whereas if the threshold value is set at a value larger than the input signal, the integrator continues to decrease until it takes a value lower than a predetermined value when the threshold value is lowered. With regard to the construction of the section 142, besides the circuit construction described above, the constructions disclosed in FIG. 1 of the U.S. Pat. No. 4,028,496 and in FIG. 2 of the U.S. Pat. No. 4,052,568 can be employed. The input signal to the transmitter-side speech signal detector 140 is supplied to the speech signal detector section 141 and the section 142 through a signal line 51. If the noise signal level present in the input signal is low, the section 142 lowers the threshold value to such an extent that the noise does not cause the speech signal detector section 141 to operate erroneously. However, in case where the noise signal level begins to rise gradually, the section 142 raises the threshold value so that the detector section 141 may not operate erroneously.

On the other hand, the receiver-side speech signal detector 300 is composed of a speech signal detector section 301 and a hangover circuit 302, and when a speech signal as shown in FIG. 5(a) has been given to the receiver and the signal level on the receiver side is higher than a preset threshold value $\theta$, the receiver-side speech signal detector 300 transmits an instruction for stopping the threshold value adapting operation (INST in FIG. 5(b)) to the transmitter-side speech signal detector 140. More particularly, the hangover circuit 302 is a circuit for extending the state of "1" at the output of the speech signal detector 301 for a predetermined period of time (T2 in FIG. 5(b)) when the output has turned from "1" to "0," and is composed of a count-T2 counter having a full count corresponding to said time period T2 and a flip-flop as shown in FIG. 6. More in detail, immediately after the input signal for the hangover circuit 302 is "1," the flip-flop is set at "1." Furthermore, when the input signal has turned from "1" to "0," a predetermined value T2 is set in the counter, and subsequently while the input signal continues to take the state "0," the counter is successively reduced by one at a predetermined time interval until the count in said counter becomes zero, when said flip-flop is reset to "0." It is noted that the hangover circuit 143 also has a construction similar to the circuit 302.

The decision of the hangover time in the hangover circuit 302 in this case is made in the following manner. The interruption of the adapting operation in the threshold value setting section 142 must continue over the entire period when an echo suppressor switch in the echo suppressor interposed between the DSI system and subscribers operates. Accordingly, it is necessary to select a value longer than the hangover time of the echo suppressor (T3 in FIG. 5(d)) as the hangover time of the hangover circuit 302 (T2 in FIG. 5(b)). Assuming that the hangover time of the echo suppressor conforms to the CCITT recommendation, it is 350 milliseconds or less. For this reason, it is necessary to select the hangover time of the hangover circuit 302 at 350 milliseconds or more.

Now description will be made on a second embodiment of the present invention. As shown in FIG. 4, the present adaptive speech signal detector is composed of a transmitter-side speech signal detector 140 and a receiver-side speech signal detector 300.

In this second embodiment, in addition to the function of stopping the adapting operation for setting a threshold value as is the case with the first embodiment, the function of stopping the adapting operation in the threshold value setting section 142 is provided by giving an inhibit signal (FIG. 5(e)) to the threshold value setting section 142 through a signal line 60, taking into consideration the fact that in case where a speech signal of a near end subscriber present on at the transmitter (NTS in FIG. 5(d)) is detected by the speech signal detector 140, a loss may be inserted at the transmitter of said echo suppressor on the grounds as will be described later.

The operations of the speech signal detector 300 and the speech signal detector 140 will be described in more detail referring to FIG. 4.

The input signal to the speech signal detector 140 is given to the speech signal detector section 141 and the threshold value setting section 142 through a signal line 51. If the noise signal level present in the input signal is low, the section 142 lowers the threshold value but not to such an extent that the noise causes the speech signal detector section 141 to operate erroneously. However, if the noise signal level begins to rise gradually, the threshold value setting section raises the threshold value so that the section 141 does not operate erroneously. On the other hand, the speech signal detector 300 is comprised of a speech signal detector section 301 and a hangover circuit 302, and if the signal level at the receiver has become higher than a preset threshold value θ, the detector 300 outputs an instruction for stopping the threshold value adapting operation to the speech signal detector 140. Here, it is essential to select the hangover time of the hangover circuit 302 at 305 milliseconds or more, similarly to the first embodiment.

In the above-described manner, the present adaptive speech signal detector does not malfunction by the operation of the echo suppressor. In some echo suppressors, as described previously, when speech signals of near end subscribers are present on the subscriber channels connected to the transmitter-side input terminals 11, . . . , 1 N of the DSI, a loss of several decibels is inserted at the receiver in order to put preference on the speech signals supplied from these subscribers. In this case, depending on the channel state, the variation in the noise level of said subscriber channel on the transmitter side of the DSI system such as the noise level in the period T6 shown in FIG. 5(c) appears (the level decrease appears). As a result, at the end of the period T6 the speech signal detector 141 erroneously detects the noise as a speech signal, and, therefore, in this case also it is necessary to stop the adapting operation of the threshold value setting section 142. More particularly, taking into consideration the hangover time of the echo suppressor, it is necessary to output a control signal (CS in FIG. 5(e)) from the hangover circuit 143 through a signal line 60 to the section 142 as shown in FIG. 4 so that the adapting operation of the section 142 may be stopped during the time period T8 in FIG. 5(e) (the time period T4 when a speech signal of a near end subscriber is present plus the hangover time T7 of the hangover circuit 143).

While the echo suppressor has been assumed to be interposed between the DSI system and the subscribers in the first and second embodiments, it is desirable to incorporate the echo suppressing function in the DSI system by the reasons such that by integrating the DSI system and the echo suppressor the speech signal detectors of both can be used in common. In that case, the interruption of the adapting operation of the threshold value setting section 142 is carried out on the basis of the operating state of the integrated echo suppressor section. It is evident that the speech signal detectors 141 and 301 can be realized by making use of the construction shown in FIG. 1 of the U.S. Pat. No. 4,001,505.

In the case where the subscriber channels connected to the DSI system are a primary group or a group of higher order of a PCM system, the PCM encoder 110 and the PCM decoder 250 become unnecessary. In addition, even in the case of an analog TASI (time assignment speech interporation), the adaptive speech signal detector of the present invention can be likewise realized in an analog fashion.

Although the description has been made above in connection to the embodiments of the present invention in which the DSI system is interposed in 4 wire telephone channels, the present invention can be practiced for the purpose of carrying out the speech processing in general 4-wire telephone channels not employing the DSI system at a high performance without errors.

What is claimed is:

1. An adaptive speech signal detector interposed in a 4-wire telephone channel for performing an adaptive threshold value setting operation depending on the channel noise level on a transmitter-side channel to detect a speech present at the transmitter, comprising: a first speech signal detector means having a transmission signal inputted thereto; an adaptive threshold value setting means having said transmission signal inputted thereto for setting a threshold value for the speech signal detection as a function of said transmission signal and giving the set value to said first speech signal detector means; a first hangover circuit for extending the output signal of said first speech signal detector means by a first predetermined period of time; a second speech signal detector means having a reception signal inputted thereto; and a second hangover circuit for extending the output signal of said second speech signal detector means by a second predetermined period of time to inhibit the adaptive operation of said threshold value setting means when an output signal from said second hangover circuit is present.

2. An adaptive speech signal detector interposed in a 4-wire telephone channel for performing an adaptive threshold value setting operation depending on the channel noise level on a transmitter-side channel to detect a speech present at the transmitter, comprising: first speech signal detector means having a transmission signal inputted thereto; an adaptive threshold value setting means having a transmission signal inputted thereto for setting a threshold value for speech signal detection as a function of said transmission signal and giving the set value to said first speech signal detector means; a first hangover circuit for extending the output signal of said first speech signal detector means by a first predetermined period to inhibit the adaptive operation of said threshold value setting means when an output signal from said first hangover circuit is present; second speech signal detector means having a reception signal inputted thereto; and a second hangover circuit for extending the output signal of said second speech signal detector means by a second predetermined period of time to inhibit the adaptive operation of said threshold value setting means when an output signal from said second hangover circuit is present.

* * * * *

UNITED STATES PATENT AND TRADEMARK OFFICE
CERTIFICATE OF CORRECTION

PATENT NO. : 4,167,653
DATED : September 11, 1979
INVENTOR(S) : Takashi ARASEKI et al It is certified that error appears in the above-identified patent and that said Letters Patent are hereby corrected as shown below:

IN THE ABSTRACT:

-- [57] Line 7 - delete "speed" insert -- speech --

IN THE SPECIFICATION:

-- Column 7, Line 9 - delete "305" insert -- 350 --

Signed and Sealed this

Eleventh Day of December 1979

[SEAL]

Attest:

SIDNEY A. DIAMOND

Attesting Officer

Commissioner of Patents and Trademarks